Patented Feb. 15, 1949

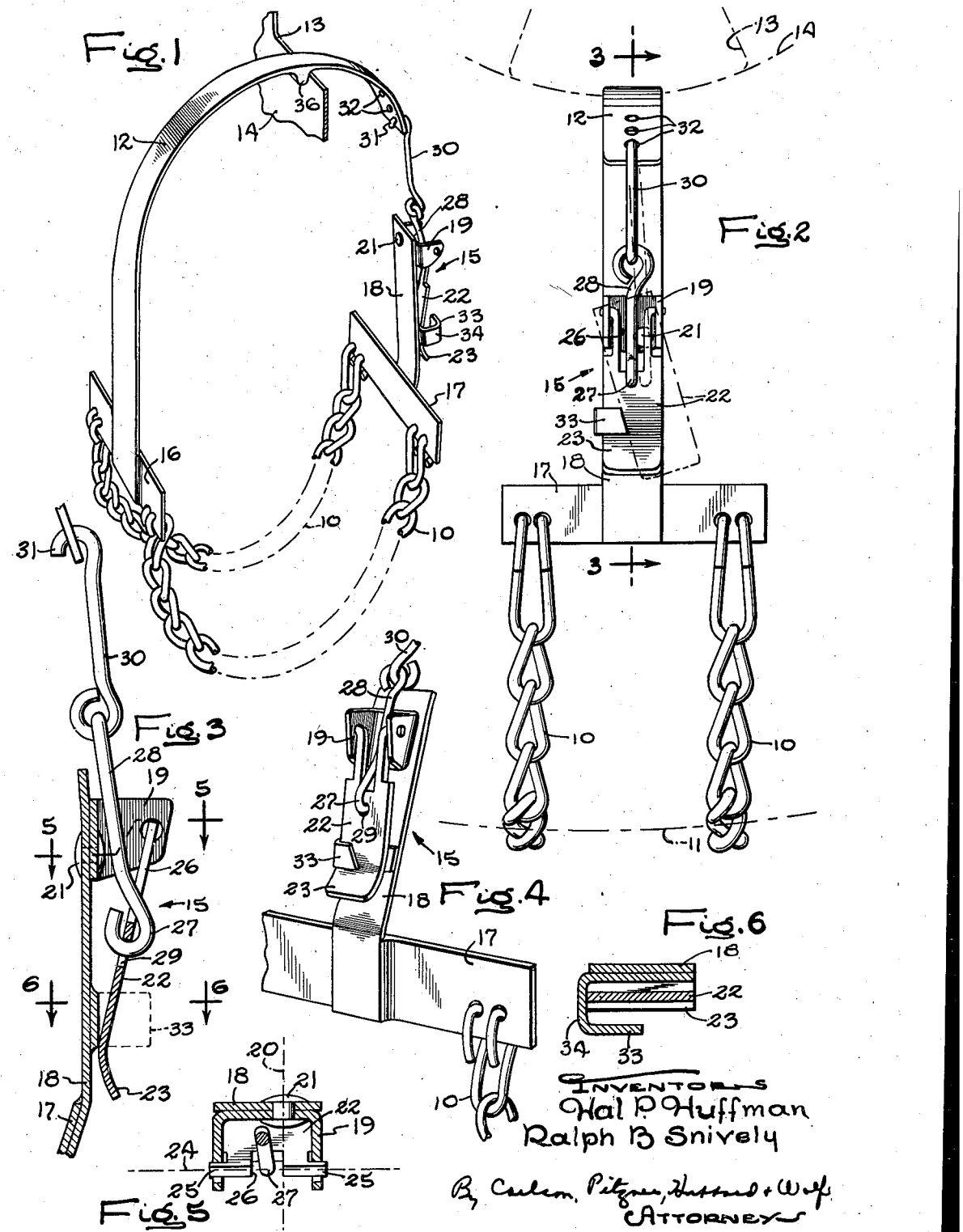

2,461,737

UNITED STATES PATENT OFFICE 2,461,737

EMERGENCY TIRE CHAIN

Hal P. Huffman, Rockford, and Ralph B. Snively, Winnebago, Ill.

Application March 24, 1947, Serial No. 736,818

6 Claims. (Cl. 152—233)

One object is to provide an emergency tire chain having a tightener which is held closed in a novel manner under the tension created in the chain.

A more detailed object is to provide an emergency chain tightener having a member adapted to swivel about the plane of the chain and pivotally connected to a lever swingable toward the chain and urged laterally into locked position under the tension on the chain.

A further object is to provide an emergency chain adapted to be threaded through a vehicle wheel and having a novel means for holding the chain against lateral shifting relative to the wheel.

Other objects and advantages of the invention will become apparent from the following detailed description taken in connection with the accompanying drawings, in which Figure 1 is a perspective view of the improved emergency chain together with a fragment of the vehicle wheel.

Fig. 2 is a side view with parts of the wheel and tire shown in phantom.

Fig. 3 is a fragmentary section taken along the line 3—3 of Fig. 2.

Fig. 4 is a fragmentary perspective view of the chain tightener.

Figs. 5 and 6 are sections taken respectively along the lines 5—5 and 6—6 of Fig. 3.

The emergency chain shown in the drawings for purposes of illustration comprises two lengths 10 of chain adapted to extend around the tread 11 of a tire and be fastened to the latter through the medium of an elongated strap 12 threaded through a hole 13 in a vehicle wheel 14, the chain being tensioned around the tire by a tightener indicated generally at 15.

Herein, the strap 12 is made of metal and generally of J-shape with the long leg connected to a crossbar 16 fastened at opposite ends to the ends of the chains 10.

The other chain ends are similarly connected to a crossbar 17 on one end of an elongated substantially flat member 18 which supports the operating parts of the tightener 15. The latter includes a swiveling element in the form of a yoke 19 mounted on the other end of the member 18 to turn about an axis 20 (Fig. 5) disposed substantially normal to the member 18. This axis is defined by a rivet 21 connecting the member 18 and the abutting closed end of the yoke 19 and offset laterally from the center of the yoke.

An elongated lever 22 is fulcrumed at one end on the projecting ends of the yoke 19 for swinging of its free end 23 against and away from the member 18 about an axis 24 (Fig. 5) extending transversely of the axis 20. Herein, this fulcrum is defined by lugs 25 projecting outwardly through holes in the yoke legs. The fulcrum end of the lever is longitudinally slotted as indicated at 26 to receive an eye 27 on one end of a link 28 which eye is hooked through a hole 29 punched in the lever intermediate the ends thereof and substantially on the longitudinal center line so as to be offset laterally from the swiveling axis 20 of the yoke 19. The other end of the link 28 is interlocked with an eye on a link 30 whose other end is formed with a hook 31 which may be received in a selected one of several holes 32 spaced along the free end of the J-shaped strap 12. This completes the loop of the chain which may be broken to permit removal of the tire by releasing the tightener 15 and unhooking the link 30.

The tension of the chain after the latter has been tightened around the tire is utilized to hold the tightener 15 against accidental release during service use. As above described, the force which is applied through the link 28 to the lever 22 eccentrically of the yoke axis 20 tends to swing the lever clockwise as viewed in Fig. 2 and carry the free end 23 thereof laterally across the member 18. If at this time the lever end 23 is disposed against the member 18, this end will enter beneath a lug 33 which overlies the lever 22 and is connected rigidly to the member 18 through a downwardly bent portion 34 which constitutes a stop for limiting the lateral swing of the lever. In use, the tire chain above described is applied to a vehicle wheel by first uncoupling the hook 31 and releasing the tightener 15. This is accomplished by swinging the lever 22 counterclockwise out from under the lug 33 as shown in phantom in Fig. 2, and then pulling the free end 23 of the lever outwardly and away from the member 18 thereby allowing the link 28 to move along the member 18 so as to elongate the chain as a whole. The short leg of the strap 12 is then threaded through the wheel 14 as shown in Fig. 1, and the hook 31 is entered in a selected one of the holes 32. Next, the lever 22 is swung downwardly about the axis 24 to carry the link 28 into the yoke slot 26 and thus shorten the chain which becomes tensioned around the tire. In this motion, the lever 22 is swung laterally as shown in phantom in Fig. 2 so as to pass the lug 33 and come against the member 18. In this movement, the link 28 moves past the center 24 so that the tension of the chain then becomes effective to hold the lever end 23 against the member 18.

Finally, the free end of the lever is moved or allowed to move by the action of the chain tension laterally in beneath the lug 33 and against the stop 34. The tightener is now locked in closed position because the tension of the chain continues to act eccentrically of the axis 20 and thereby hold the lever against the stop 34. The lever may, however, be swung laterally out from under the lug 33 when it is desired to release the tightener and release the chain from the wheel by reversing the procedure described above.

Means is provided for holding the chain thus applied against sidewise movement relative to the wheel 14 under the unbalanced centrifugal forces due to the excess weight of the tightener 15. Herein, this means comprises a lug 35 formed on the inner side of the strap 12 at the bend therein and in a position to engage the side of the wheel 14 opposite from the tightener 15. When the chain is properly tensioned, this lug will limit the sliding of the strap 12 through the wheel as shown in Fig. 1 and thus hold the chains 10 in proper relation with respect to the tire tread.

The emergency chain thus provided is simple and inexpensive in construction, may be applied easily to a tire, and remains locked securely in the proper position during service use.

We claim as our invention:

1. In an emergency tire chain, the combination of a chain terminating in an end member, a yoke with its closed end abutting said member and pivotally connected thereto to swivel about an axis perpendicular to said member, a tongue having a fork at one end with the legs thereof pivotally connected to the legs of said yoke to turn about an axis extending transversely of said first axis, a link detachably connectable to the other end of said chain connecting the free end of said tension link to said tongue intermediate the ends thereof and at a point offset laterally from said first axis whereby the tension on said link tends to swing said tongue laterally, and a lug on said member limiting such lateral swinging of said tongue and overlying the same to hold the free end of the tongue adjacent said member.

2. The combination of a length of chain terminating in a member at one end, a yoke element projecting from said member and swiveled thereon to turn about an axis substantially normal to the member, a lever fulcrumed on the out end of the yoke legs for swinging of the free end of the lever against and away from said member, the fulcrum end of said lever being slotted along a longitudinal line offset laterally from the said axis, a tension link detachably connected at one end to the other end of said chain and connected at its other end to said lever at the closed end of said slot so as to lie in the latter and said yoke when the free end of said lever is against said member, said lever being swung laterally under the tension applied to said chain, and means on said member receiving the lever when the latter is swung laterally and acting to hold the free lever end against said member.

3. The combination of a length of chain having a flat member at one end and a tension link at the other, a yoke swiveled on said member to turn about an axis normal thereto, an elongated lever pivotally connected at one end to the legs of said yoke to swing toward and away from said member, means connecting said tension link to said lever intermediate the ends of the latter and offset laterally from said first axis, and means on said member providing a notch opening laterally toward said lever to receive said lever when the latter is disposed adjacent said member and swung laterally under the tension of said chain.

4. The combination of a length of chain having a flat member at one end and a tension link at the other, a yoke swiveled on said member to turn about an axis normal thereto, a lever pivotally connected at one end to the legs of said yoke to swing toward and away from said member, means connecting said tension link to said lever intermediate the ends of the latter and at a point offset laterally from said first axis and lying closer to said member than the fulcrum of the lever, and means on said member providing a notch opening laterally toward said tongue to receive said tongue when the latter is disposed adjacent said member and swung laterally under the tension of said chain.

5. The combination of a length of chain terminating in a member at one end, an element projecting from said member and swiveled thereon to turn about an axis substantially normal to the member, a lever fulcrumed on the projecting end of said element to swing against and away from said member, a tension link detachably connected at one end to the other end of said chain and connected at its other end to said lever at a point intermediate the ends of the lever and offset laterally of the lever from said axis whereby the free end of the lever is swung laterally under the tension applied to said chain, and means on said member receiving the lever when the latter is swung laterally and acting to hold the free lever end against said member.

6. An emergency tire chain having, in combination, a metal strap adapted to be threaded through a vehicle wheel, a chain connected at one end to one end of said strap and at the other end to an elongated member, a link detachably connectable at one end to the other end of said strap, a tightener connecting said member and the other end of said link so as to lie at one side of the tire and wheel to which the chain is applied, and a stop rigid with said strap on the inside thereof at a point spaced from said link and operable to engage the vehicle wheel and limit endwise threading of said strap therethrough under the centrifugal force due to the weight of said member and tightener.

HAL P. HUFFMAN.
RALPH B. SNIVELY.

REFERENCES CITED

The following references are of record in the file of this patent:

UNITED STATES PATENTS

| Number | Name | Date |
| --- | --- | --- |
| 513,727 | Potts | Jan. 30, 1894 |
| 2,315,059 | Kane | Mar. 30, 1943 |